W. P. PITT.
PUNCHING DEVICE.
APPLICATION FILED JUNE 29, 1912.
1,205,257.
Patented Nov. 21, 1916.
3 SHEETS—SHEET 3.
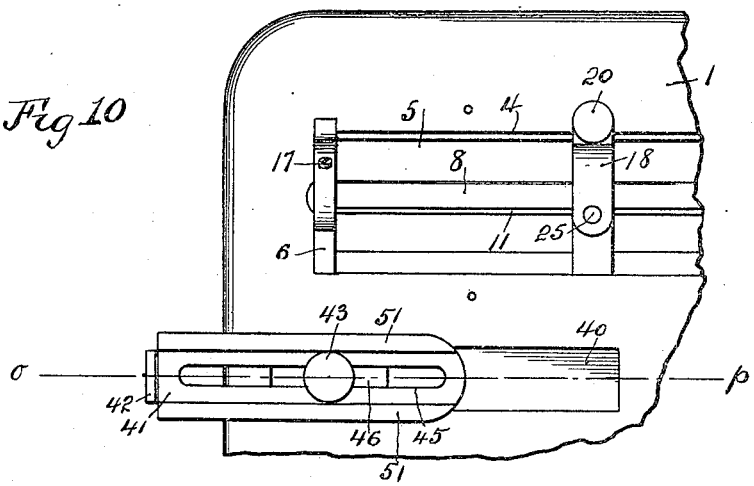
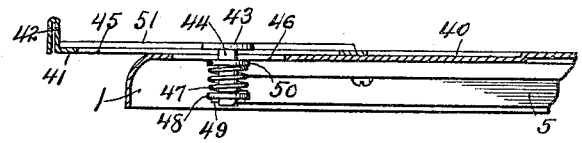
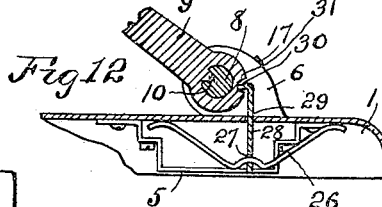 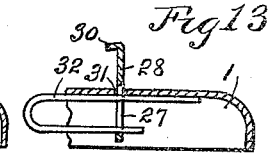
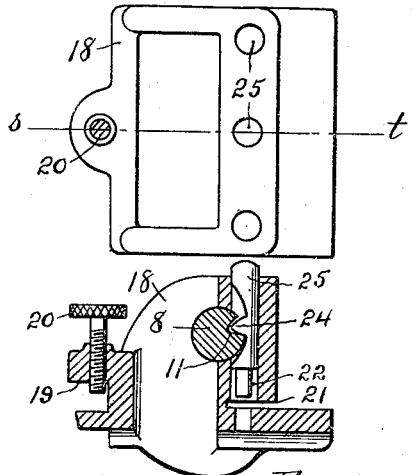
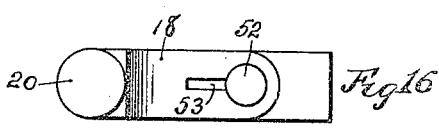
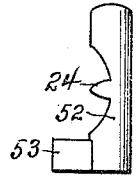
WITNESSES:
R. E. Hamilton
E. B. House
INVENTOR.
William P. Pitt
BY Warren D. House
His ATTORNEY.

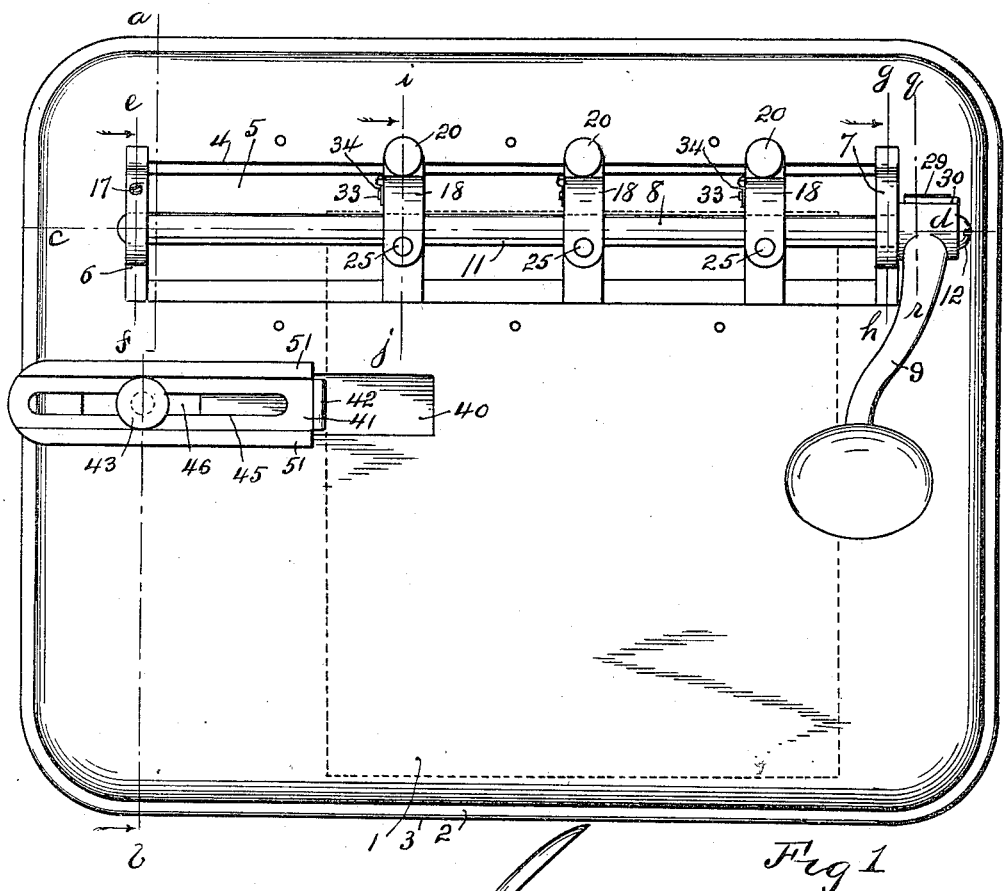

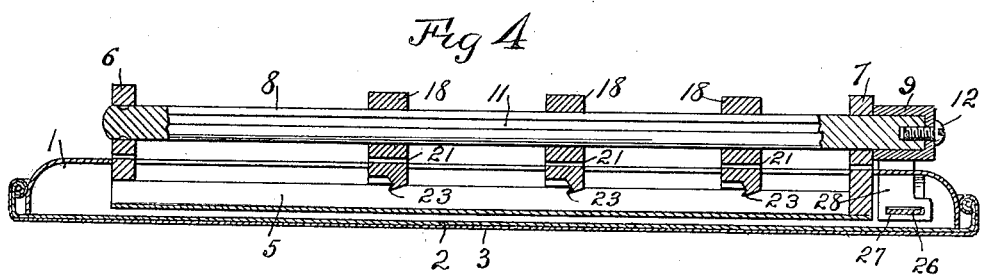
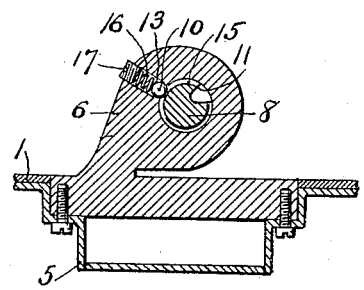
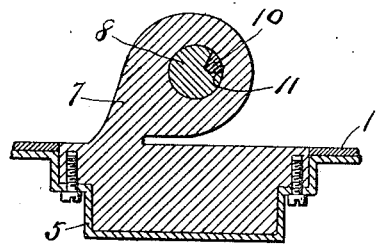
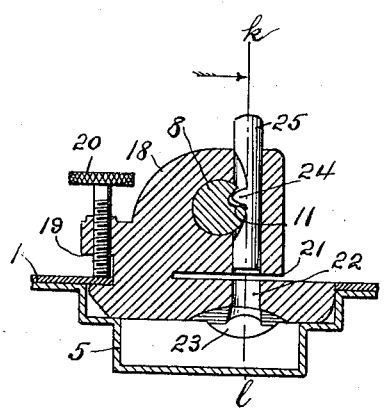
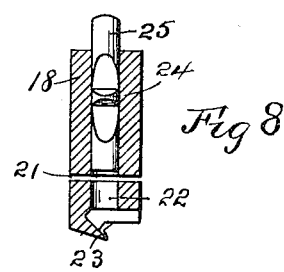
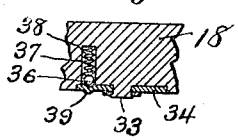

UNITED STATES PATENT OFFICE.

WILLIAM P. PITT, OF INDEPENDENCE, MISSOURI, ASSIGNOR TO IRVING-PITT MANUFACTURING COMPANY, OF KANSAS CITY, MISSOURI, A CORPORATION OF MISSOURI.

PUNCHING DEVICE.

1,205,257.　　　　Specification of Letters Patent.　　Patented Nov. 21, 1916.

Application filed June 29, 1912.　Serial No. 706,557.

*To all whom it may concern:*

Be it known that I, WILLIAM P. PITT, a citizen of the United States, residing at Independence, in the county of Jackson and State of Missouri, have invented a certain new and useful Improvement in Punching Devices, of which the following is a specification.

My invention relates to improvements in punching devices.

My invention is particularly adapted for use in perforating sheets of paper used in loose leaf books and binders.

One object of my invention is to provide a device which may be readily adjusted so as to punch the holes in a sheet at different distances apart.

Another object of my invention is to provide a construction in which the punches and dies used may be quickly removed from the machine and others substituted therefor.

My invention provides further novel means for operating the punches.

My invention also provides a die member with novel means for laterally deflecting the punchings to prevent their piling up under the die member.

My invention further provides novel means for adjustably regulating the distance from the ends of the sheets of the perforations punched therein.

My invention further provides a novel side edge gage mechanism by which a great range of adjustment may be obtained.

Other novel features of my invention are hereinafter fully described and claimed.

In the accompanying drawings which illustrate the preferred and modified forms of my invention, Figure 1 is a plan view of the machine. Fig. 2 is a vertical section on the line $a$—$b$ of Fig. 1. Fig. 3 is an enlarged side elevation of one of the cam gages. Fig. 4 is a vertical section on the line $c$—$d$ of Fig. 1. Fig. 5 is an enlarged cross section on the line $e$—$f$ of Fig. 1. Fig. 6 is an enlarged cross section on the line $g$—$h$ of Fig. 1. Fig. 7 is an enlarged cross section on the line $i$—$j$ of Fig. 1. Fig. 8 is a vertical section on the line $k$—$l$ of Fig. 7. Fig. 9 is an enlarged cross section of a portion of the cam gage mechanism taken on the plane of the line $m$—$n$ of Fig. 2. Fig. 10 is a plan view of a portion of the machine, showing the side gage in a position opposite to that of Fig. 1. Fig. 11 is a vertical section on the line $o$—$p$ of Fig. 10. Fig. 12 is an enlarged cross section on the line $q$—$r$ of Fig. 1. Fig. 13 is a vertical section showing a modified form of retracting spring for returning the rock shaft to its initial position. Fig. 14 is a plan view of one of the die members which carries a plurality of punches, the set screw being shown in cross section. Fig. 15 is a vertical section on the line $s$—$t$ of Fig. 14. Fig. 16 is a plan view of a punch and die arranged to cut slots in the upper ends of loose leaves. Fig. 17 is an elevation of the punch shown in Fig. 16.

Similar reference characters designate similar parts in the different views.

1 designates a base member, which may be of any desired form and material, and which is shown as an inverted rectangular pan having rounded corners. The base member 1 is mounted removably in a pan 2 preferably covered with a soft material, such as felt 3 to prevent scratching of the surface of the support upon which the machine may be mounted. The base member 1 is provided with a longitudinal slot 4 below which may be secured to the under side of the base member a trough 5 having an open end through which punchings deposited in the trough by the dies may be discharged into the pan or receptacle 2.

Two bearings 6 and 7 are mounted in and secured to the trough 5 adjacent opposite ends thereof. Pivotally mounted in the bearings 6 and 7 and adapted to be withdrawn endwise therefrom is a horizontal rock shaft 8, which is disposed longitudinally above the slot 4. The rock shaft 8 is provided with a crank 9, which has a hole in which one end of the rock shaft is fitted, and which is provided with a longitudinal fin 10, shown in Fig. 12, which is fitted in a longitudinal groove 11 extending, preferably, the entire length of the rock shaft. A screw 12 extends through a hole provided in the crank 9 and is removably fitted in a screw threaded hole provided centrally in the adjacent end of the rock shaft 8. To removably secure the rock shaft 8 in the bearings 6 and 7 one of these bearings, as for example the bearing 6, is provided with a screw threaded hole 13, shown in Fig. 5, which intersects the horizontal hole in the bearing 6 in which the rock shaft is mounted. In the hole 13 is mounted a longitudinally movable member, such as a ball 14 which normally projects into an annular groove 15 provided in the rock shaft 8. A coil spring 16 is mounted in the hole 13 and has one end bearing against a screw threaded removable plug 17 which is fitted in the threaded outer end of the hole 13. The other end of the said spring 16 bears against the ball 14 and retains the ball normally in the groove. The inner end of the hole 13 is contracted to a diameter small enough to prevent the ball 14 passing inwardly from the hole 13 when the rock shaft 8 is removed from the bearing. A forcible pull endwise on the rock shaft 8 will cause its disengagement from the ball 14 and from the bearing 6, for the purpose of slipping on or off the die members, as hereinafter described.

Referring to Figs. 1, 2, 4 and 7, 18 designates a plurality of die members, each of which is provided with a transverse hole in which the rock shaft 8 is slidably and rotatively mounted. The die members 18 are supported on the trough 5 in the slot 4, and are each adjustable lengthwise of said trough. Each die member 18 at its rear side is provided with a transverse groove 19, Fig. 7, in which is located the top portion of the base member 1 which is at the rear side of the slot 4. Each die member is also provided with means for releasably locking it to the base member. For this purpose I have shown a vertical set screw 20 mounted in each die member 18 and extending into the groove 19 so as to bear against the upper side of the base member 1. Each die member 18 is provided in its forward side with a horizontal slot 21 adapted to receive therein the sheets of paper or other material which are to be punched. Each die member 18 is also provided with a vertical hole 22 therethrough, said hole intersecting the horizontal hole in which the rock shaft 8 is mounted, and also intersecting the slot 21. The lower end of the hole 22 is located, preferably above the trough 5 so as to discharge punchings therein. To prevent the punchings accumulating in a pile below the hole 22, I provide means for laterally deflecting the punchings as they emerge from the hole. To effect this function, I preferably provide the lower side of each die member 18 with a lip 23 which extends partly across the lower end of the hole 22 and is provided with an upper inclined surface, as shown in Figs. 7 and 8. In the hole 22 of each die member 18 is reciprocatively mounted a punch which operatively and, preferably, interlockingly engages the rock shaft 8, whereby, when the rock shaft is oscillated, the punch will be reciprocated. This engagement is preferably effected by means of a tooth 24 on one side of the punch, said tooth being disposed in the groove 11 of the rock shaft 8 in the manner of a rack engaging a pinion.

When the rock shaft is rocked in the proper direction, the punch, which is designated by 25, is moved downwardly across the slot 21 and through the leaves which may be placed in said slot. By having the rock shaft extend through, and, preferably, fitting the die members 18, said die members serve as bearings for the rock shaft to retain it engaged with the punches and prevent its being sprung. As shown, the intersecting holes for receiving the rock shaft and punch in each die member are, preferably, circular to permit the use of a cylindrical rock shaft and punch. To retract the punches 25 upwardly, suitable means is provided for retractively rocking the rock shaft 8. In Fig. 12 I have shown for this purpose a bow shaped spring 26, which extends through a slot 27 in the lower end of a vertical plate 28, which extends through a slot 29 in the base member 1 and has a laterally turned flange 30 at its upper end which is mounted in a longitudinal slot 31 in the crank 9. The ends of the spring 26 bear against the under side of the base member 1.

In Fig. 13 I have shown a modification of the spring mechanism for retracting the rock shaft 8. In this modified form both ends of a U shaped spring 32 extend through the slot 27 of the plate 28, one arm of the spring bearing against the said plate and the other arm bearing against the under side of the base member 1. To adjustably regulate the distance that the punches 25 perforate the sheets from their ends, I provide the following described gage mechanism: Each die member 18 to the rear of the slot 21 is provided with a laterally extending stud 33, Fig. 2 and Fig. 9, on which is pivoted a gage plate 34 disposed so as to extend across the slot 21 and provided with an eccentric gage surface 35. By turning the cam gage plate 34 to different positions on the stud 33, the depth to which the sheets to be perforated may be slipped in the slot 21, is regulated. To releasably hold the gage plate 34 in the position to which it is adjusted, I provide yielding means, preferably comprising a ball 36 located in a horizontal hole 37 in the die member 18 at the inner side of the gage plate 34, and a spring 38 of the coil type mounted in the hole 37 and normally forcing the ball against the gage plate 34. Said gage plate 34 on its inner side is provided with a plurality of cavities, preferably depressions, disposed concentrically relatively to the stud 33. As the gage plate 34 is turned, the ball 36 will be successively forced into the depressions or cavities, which are indicated by 39. For gaging the side edges of the sheets to be perforated, I provide the following described mechanism: In the top of the base member 1 adjacent to the bearing 6, is provided a groove 40 in which is slidably mounted a horizontal gage plate 41, which has one end upturned at 42, and which is releasably held in the position in which it may be adjusted by the head 43 of a vertical pin 44, which extends through a slot 45 in the gage plate 41 and through a longitudinal slot 46 in the groove 40. A coil spring 47 encircles the pin 44 and has its lower end bearing against a washer 48, which in turn is supported by a transverse pin 49 mounted in the pin 44. The upper end of the spring 47 bears against a washer 50 mounted on the pin 44 and bearing against the under side of the base member 1. The strength of the spring 47 is sufficient to hold the gage plate 41 in the position to which it may be adjusted. If it is desired to change the said gage plate from the position shown in Fig. 1 to that shown in Fig. 10 and Fig. 11, it is lifted at one end against the pressure of the spring 47 so as to clear the groove 40, after which it may be swung on the pin 44 to a diametrically opposite position, in which position, when released, it will lie in the groove 40, as shown in Fig. 10. Preferably, as shown, the gage plate 41 is provided along its longitudinal edges with lateral flanges 51 which have their upper sides flush with the top of the pin 44. This construction permits a wide range of adjustability and, the flanges 51 serve to prevent the edges of the sheets striking the pin 44 when the gage plate 41 is in the position shown in Fig. 10.

In the form of die member shown in Fig. 14 and Fig. 15, a plurality of punches 25 are mounted in each die member. Otherwise the die member is as is shown in Fig. 1.

In Fig. 16 and in Fig. 17 I have shown a form of punch adapted to punch a slot in the end of a sheet, the punch designated by 52, being formed similar to the punches 25, with the exception that it has a lateral wing 53. The die member shown in Fig. 16 has a vertical hole shaped to fit this punch, otherwise the parts are constructed similarly to the punch and die member shown in Fig. 7.

In the operation of my invention, the rock shaft 8 is pulled out of the bearing 6 and die members 18 are slipped into the trough 5 and upon the rock shaft, passing on at the free end of said shaft. When the desired number and kind of die members carrying their punches have been placed on the rock shaft, with the teeth 24 of the punches disposed in the groove 11, the rock shaft 8 is again forced into its proper position in the bearing 6, with the flange 30 of the plate 28 disposed in the groove 31 of the crank 9. The die members 18 are then adjusted along the rock shaft 8 and the trough 5 to the proper positions, after which the set screws 20 are tightened against the base member 1. The gage plate 41 is then adjusted to its proper position. The gage plates 34 are also adjusted to the proper positions in the die members 18. The sheets to be punched are then inserted in the slots 21 and against the cam surfaces 35 of the gage plates 34, the sheets being also brought laterally against the up turned portion 42 of the gage plate 41. The crank 9 is now forced downwardly thus rocking the rock shaft 8 so as to force the punches 25 through the sheets in the slots 21. The punchings will pass through the holes 22 of the die members 18 and into the trough 5, from which they can be brushed from time to time into the pan 2. Upon the crank 9 being released, the spring 26 will pull down on the plate 28, thus retracting the crank, and with it the rock shaft 8 and punches 25 to their initial positions shown in Fig. 2. By simply loosening the set screws 20 the die members 18 may be quickly moved to any desired position on the rock shaft 8. As the teeth of the punches 25 are always in mesh with the rock shaft 8, the rock shaft is always in operative engagement with the punches.

I do not limit my invention to the structures shown and described, as modifications, other than shown, may be made, within the scope of the appended claims, without departing from the spirit of my invention.

Having thus described my invention, what I claim and desire to secure by Letters Patent, is:—

1. In a punching device, a base member having two bearings, a rock shaft pivotally mounted in said bearings and slidable lengthwise out of engagement with one of said bearings, a die member adjustable lengthwise on the rock shaft and engaging the base member and removable from the rock shaft when said shaft has been disengaged from one of said bearings, and a punch member reciprocative in said die member and operatively engaging the rock shaft.

2. In a punching device, a base member having a bearing, a rock shaft pivoted in said bearing, and releasable means for engaging said rock shaft and holding it from withdrawal from said bearing, and a die member longitudinally adjustable on the rock shaft.

3. In a punching device, a base member having a bearing provided with a transverse hole, the bearing having another hole intersecting the first, a rock shaft pivoted in the first named hole and having a peripheral groove, and a yielding locking device mounted in the second hole and adapted to enter said groove.

4. In a punching device, a base member having a bearing having two intersecting holes, a rock shaft pivoted in one hole and having a peripheral recess, a locking device mounted in the other hole and adapted to enter said recess, and yielding means for normally forcing said locking device into said recess.

5. A die member having a punch hole, and a gage member rotatively adjustable thereon and having a gage surface eccentric to its axis.

6. A die member having a punch hole, a gage member rotatively adjustable thereon and having a gage surface eccentric to its axis, and means for releasably holding the gage member in the position to which it may be adjusted.

7. A die member, a gage member rotatively adjustable thereon and having a gage surface eccentric to its axis and provided with a plurality of cavities concentric with its axis, and a locking device carried by the die member and adapted to successively releasably enter said cavities, when the gage member is rotated.

8. A die member, a gage member rotatively adjustable thereon and having a gage surface eccentric to its axis and provided with a plurality of cavities concentric with its axis, and a spring actuated locking device carried by the die member and adapted to successively enter said cavities when the gage member is rotated.

9. A die member having a hole, a gage member rotatively adjustable on said member and having a gage surface eccentric to its axis and provided with a plurality of cavities concentric with its axis, a ball located in said hole and adapted to successively enter said cavities when the gage member is turned, and a spring for normally forcing said ball into said cavities.

10. In a punching device, a base member having a bearing, a rock shaft movable at one end into and out of engagement with said bearing, and a die member in which the rock shaft is pivoted, the die member being slidable onto and off from said rock shaft at said end of said rock shaft when the said end is disengaged from said bearing.

11. In a punching device, a base member, a reversible stop gage longitudinally slidably and pivotally engaging said base member, and yielding means for retaining said gage in slidable engagement with the base member.

12. In a punching device, a base member having guiding means, a reversible stop gage normally slidably engaging said guiding means in either of two positions, the gage being movable out of engagement with the guiding means, and when so disengaged being reversible in position, and yielding means for holding the gage in engagement with said guiding means.

13. In a punching device, a base member having a bearing, a rock shaft pivoted in and movable at one end out of engagement with the bearing, a die member adjustable lengthwise on the rock shaft and movable onto and off from said end of the rock shaft when it is disengaged from said bearing, and a punch slidable in the die member and having toothed engagement with the rock shaft, said toothed engagement permitting longitudinal movement of the die member on the rock shaft to different positions without disengagement of the punch from the rock shaft.

14. A die member having a punch hole therethrough and adapted to cut a punching the full size of the hole, and having closely adjacent to the discharge end of said hole means for laterally deflecting punchings emerging therefrom.

15. A die member having a punch hole therethrough and adapted to cut a punching the full size of the hole, and having closely adjacent to the discharge end of said hole an inclined lip extending partly across said hole.

16. A die member having a punch hole therethrough and adapted to cut a punching the full size of the hole, and having closely adjacent to the discharge end of said hole an inclined lip extending partly across said hole and a shallow punching receptacle into which the punchings are discharged from said hole.

17. A die member having a punch hole therethrough, and a punching receptacle upon which said die member is longitudinally adjustably mounted, and into which the punchings are discharged from said hole.

18. A die member having a punch hole therethrough, and a punching receptacle of channel form and having an open discharge end and into which the punchings are discharged from said hole.

19. A die member having a punch hole therethrough, and a channel-shaped punching receptacle having an open discharge end and upon which the die member is longitudinally adjustably mounted, and into which the punchings are discharged from said hole.

20. A die member having a punch hole therethrough and adapted to cut a punching the full size of the hole, and provided closely adjacent to the discharge end of said hole with an inclined lip extending partly across the hole, and a shallow channel-shaped punching receptacle having an open end and adapted to receive punchings from said hole.

21. A base having a slot, a channel-shaped punching receptacle having an open discharge end and secured to the under side of said base and extending across said slot and a die member having a punch hole discharging into said receptacle.

22. A base having a slot, a channel-shaped punching receptacle having an open discharge end and secured to the under side of said base and extending across said slot, and a die member longitudinally adjustable in said slot and having a punch hole discharging into said receptacle.

23. A pan, a hollow base mounted in said pan and having a slot, a channel-shaped punching receptacle having an open end and secured to the under side of said base and extending across said slot, and a die member having a punch hole discharging into said receptacle.

24. A pan, a hollow base mounted therein and having and having a slot, a channel-shaped punching receptacle open at one end and extending across said slot between the pan and base, and a die member having a punch hole discharging into said receptacle.

25. A pan, a hollow base mounted therein and having a slot, a channel-shaped punching receptacle open at one end and disposed between the pan and base below said slot, and a die member having a punch hole discharging into said receptacle and provided with an inclined lip extending partly across and closely adjacent to the discharge end of said hole.

26. A base having a hole therethrough, a rock member pivoted to said base, a spring having a bearing at the under side of said base, and connecting means extending through said hole and connected to said rock member and to said spring and adapted to be retracted by said spring and to retract said rock member, when the rock member is swung from a pre-determined position.

27. A base having a hole therethrough, a rock shaft pivoted thereto and provided with a crank handle, a spring adapted to bear against the under side of said base and a member extending through said hole and connected to said spring and to said handle.

28. A base having a hole therethrough, a rock shaft pivoted thereto and provided with a crank handle having a notch, a connecting member extending through said hole and having a projection disposed in said notch, and a spring having a bearing against the under side of said base and secured to said member.

29. A base having a slot, a channel-shaped punching receptacle open at one end and secured to the under side of said base and extending across said slot, a die member having a punch hole discharging into said receptacle and provided with a notch adapted to receive said base, and a securing screw mounted in said die member and extending into said notch and adapted to bear against the upper side of said base.

30. A punching machine provided with a base, a cylindrical rock shaft pivotally mounted thereon and provided with a longitudinal groove extending lengthwise from one end of the shaft, a die member longitudinally movable on the rock shaft and supported by said base, a punch slidably mounted in said die member and having a tooth mounted in said groove, and a crank handle fitted on said rock shaft and having a projection extending into said groove.

31. In a punching device, a rock shaft having a longitudinal groove, a die member in which the rock shaft is oscillatable and longitudinally adjustable, and a punch member reciprocative in the die member and provided with a single tooth mounted in said groove.

32. In a punching device, a rock shaft having a longitudinal groove, a die member, and a punch member reciprocative in the die member and having a single tooth mounted in said groove.

33. In a punching device, a rock shaft having a longitudinal groove, a die member in which the rock shaft is oscillatable, and a punch member reciprocative in the die member and having a single tooth mounted in said groove.

34. In a punching device, a cylindrical rock shaft having a longitudinal groove, a die member, and a cylindrical punch member reciprocative in the die member and having a single tooth mounted in said groove and contained wholly within the cylindrical surface of the punch member.

35. In a punching device, a cylindrical rock shaft having a longitudinal groove, a die member, and a punch member reciprocative in the die member and having a single tooth mounted in said groove and lying wholly within the lines of the bearing surface of the punch member.

In testimony whereof I have signed my name to this specification in presence of two subscribing witnesses.

WILLIAM P. PITT.

Witnesses:
WARREN D. HOUSE,
ELMA L. THOMPSON.

Copies of this patent may be obtained for five cents each, by addressing the "Commissioner of Patents, Washington, D. C."